(12) United States Patent
Nagora et al.

(10) Patent No.: US 8,327,700 B2
(45) Date of Patent: Dec. 11, 2012

(54) HOUSING FASTENER ON SNAP-IN VALVE

(75) Inventors: Andreas Nagora, Walzbachtal (DE); Sisay Tadele, Ludwigsburg (DE)

(73) Assignee: BorgWarner BERU Systems GmbH, Ludwigsburg (DE)

( * ) Notice: Subject to any disclaimer, the term of this patent is extended or adjusted under 35 U.S.C. 154(b) by 266 days.

(21) Appl. No.: 12/865,183

(22) PCT Filed: Feb. 23, 2009

(86) PCT No.: PCT/DE2009/000239
§ 371 (c)(1),
(2), (4) Date: Jul. 29, 2010

(87) PCT Pub. No.: WO2009/109163
PCT Pub. Date: Sep. 11, 2009

(65) Prior Publication Data
US 2010/0326180 A1   Dec. 30, 2010

(30) Foreign Application Priority Data
Mar. 6, 2008   (DE) .......................... 10 2008 013 050

(51) Int. Cl.
*B60C 23/02* (2006.01)
(52) U.S. Cl. ......................................... 73/146.8; 73/146
(58) Field of Classification Search .................. None
See application file for complete search history.

(56) References Cited

U.S. PATENT DOCUMENTS

| | | | |
|---|---|---|---|
| 4,953,394 A | 9/1990 | Franke et al. | |
| 5,844,131 A | 12/1998 | Gabelmann et al. | |
| 6,005,480 A * | 12/1999 | Banzhof et al. | 340/447 |
| 6,055,855 A * | 5/2000 | Straub | 73/146.8 |
| 6,101,870 A * | 8/2000 | Kato et al. | 73/146.8 |
| 6,568,259 B2 * | 5/2003 | Saheki et al. | 73/146 |
| 6,591,672 B2 * | 7/2003 | Chuang et al. | 73/146.8 |
| 6,722,409 B1 * | 4/2004 | Martin | 152/427 |
| 6,895,810 B2 * | 5/2005 | Saheki et al. | 73/146.8 |
| 6,959,597 B2 | 11/2005 | Ito et al. | |
| 7,017,403 B2 * | 3/2006 | Normann et al. | 73/146.2 |
| 7,021,133 B1 * | 4/2006 | Hsu | 73/146.8 |
| 7,059,178 B2 | 6/2006 | Fischer et al. | |
| 7,107,830 B1 * | 9/2006 | Yu et al. | 73/146.4 |
| 7,669,466 B2 * | 3/2010 | Ray et al. | 73/146.8 |
| 2005/0087007 A1 | 4/2005 | Uleski | |
| 2007/0295076 A1 | 12/2007 | Blossfeld et al. | |
| 2009/0229676 A1 | 9/2009 | Palaoro et al. | |

FOREIGN PATENT DOCUMENTS

| | | |
|---|---|---|
| DE | 103 39 959 A1 | 4/2005 |
| DE | 10 2005 027 002 A1 | 12/2006 |
| EP | 2 250 036 B1 | 11/2011 |
| FR | 2 894 518 A1 | 6/2007 |

\* cited by examiner

*Primary Examiner* — Lisa Caputo
*Assistant Examiner* — Jermaine Jenkins

(57) ABSTRACT

A device for measuring tire pressure in a pneumatic tire of a motor vehicle using a sensor on the rim well of a rim which accommodates a tire valve for the pneumatic tire and a receiver outside of the pneumatic tire being assigned to the sensor, wherein an electronics housing or signal housing assigned to the rim well is connected to the tire valve, said housing containing transmission electronics as the tire pressure sensor, and is connected to the tire valve by a fastening element substantially in the region of the valve base part.

7 Claims, 3 Drawing Sheets

HOUSING FASTENER ON SNAP-IN VALVE

A device for measuring tire pressure in a pneumatic tire of a motor vehicle using a sensor on the rim well of a rim which accommodates a tire valve for the pneumatic tire, tire pressure being applied to the sensor, and a receiver outside of the pneumatic tire being assigned to the sensor, wherein an electronics housing or signal housing assigned to the rim well is connected to the tire valve, contains transmission electronics as the tire pressure sensor, and is connected to the tire valve by a fastening element substantially in the region of the valve base part.

DE 37 34 053 A1 discloses a device for measuring tire pressure in a pneumatic tire of a motor vehicle; a bellows is situated in the pneumatic tire in an approximately axially parallel direction of motion and is connected on the outside of the tire to a permanent magnet which can be displaced in an axially parallel manner depending on the tire pressure, the measurable position of the bellows changing when deviations from the normal tire pressure occur. An electronic component that generates a voltage that is perpendicular to a flowing current and to a magnetic field, due to the Hall effect, is used as the stationary sensor outside of the pneumatic tire. The Hall effect mentioned above is based on the principle that, in electrical conductors situated in a homogeneous magnetic field and in which an electrical current flows that is perpendicular to the magnetic field, a voltage differential is produced that is perpendicular to the magnetic field and perpendicular to the current. The magnitude of this effect depends on the conductive material, and is characterized by the particular Hall constant.

In regard to the sensor which rotates about the wheel axis, the centrifugal force that it produces generates frictional forces between the bellows or the permanent magnet holder on the one hand and the pressure tube on the other hand. Therefore the axial motion of the permanent magnet that is required for measurement purposes can become disturbed, thereby resulting in hysteresis. Hysteresis prevents fulfillment of the requirement that there be a linear, speed-independent correlation between tire pressure and the motion of the sensor.

To simplify attachment of the sensor in the region of the rim, and to ensure that the sensor continues to operate reliably even when the vehicle tire is changed, a device of the type in question is provided by DE 296 23 466 U1. It is delivered in parts to the vehicle manufacturer, where it is assembled upon installation.

The object of the invention is to provide a modification of the system, as a development of the wheel module, in order to simplify installation.

The teaching of the independent claim leads to the solution of this object; the dependent claims provide advantageous developments. All combinations of the features disclosed in the description, the drawing, and/or the claims also fall within the scope of the invention.

SUMMARY OF THE INVENTION

According to the invention, a device for measuring tire pressure in a pneumatic tire of a motor vehicle by means of a sensor on the rim well of a rim, which accommodates a tire valve for the pneumatic tire, is assigned to a receiver outside of the pneumatic tire. An electronics housing or signal housing assigned to the rim well is connected to the tire valve and contains transmission electronics as the tire pressure sensor. It is connected to the tire valve by a fastening element substantially in the region of the valve base part. It is advantageous that the device can be installed e.g. using electrical pindrivers since the fastening element is situated such that it is substantially freely accessible and can therefore be installed from above.

According to a further advantageous development, the angle alpha between the fastening element and the valve axis can lie in a range of approximately 30 to 150 degrees. It can therefore be guaranteed that the appropriate housing can always be installed on any type of rim.

According to another advantageous development, the electronics housing or signal housing includes a receiving element having a rotation lock for receiving the valve base part of the tire valve, the rotation lock being composed e.g. of one, two, or more key surfaces or groove and tongue combinations between the valve base and the receiving element. It is advantageous that the valve base can never be inserted incorrectly, thereby simplifying installation even further.

According to an advantageous development, the fastening element is designed as a pin or a clamp or a tongue. It is advantageous, in particular, that the connections are detachable, and can be quickly replaced, loosened, or fastened when performing maintenance or replacement.

According to a further advantageous development, the air opening is situated substantially perpendicularly to the valve axis in the region of the valve base. It is advantageous that the air supplied via the valve is connected directly to the interior of the tire since the passage opening is situated freely inside the interior of the tire or the airspace in the tire.

According to an alternative embodiment, the valve base includes a thickened region that is used as a stop and makes possible a defined penetration into the receiving element. A spring-loaded pin or a ball is situated on the valve base or in the receiving element. The ball has on its corresponding opposite side—valve base or receiving element—an e.g. round or hemispherical recess for creating a snap-in connection.

BRIEF DESCRIPTION OF THE DRAWING

Further advantages result from the drawings, which show in

DETAILED DESCRIPTION

Figure 1:
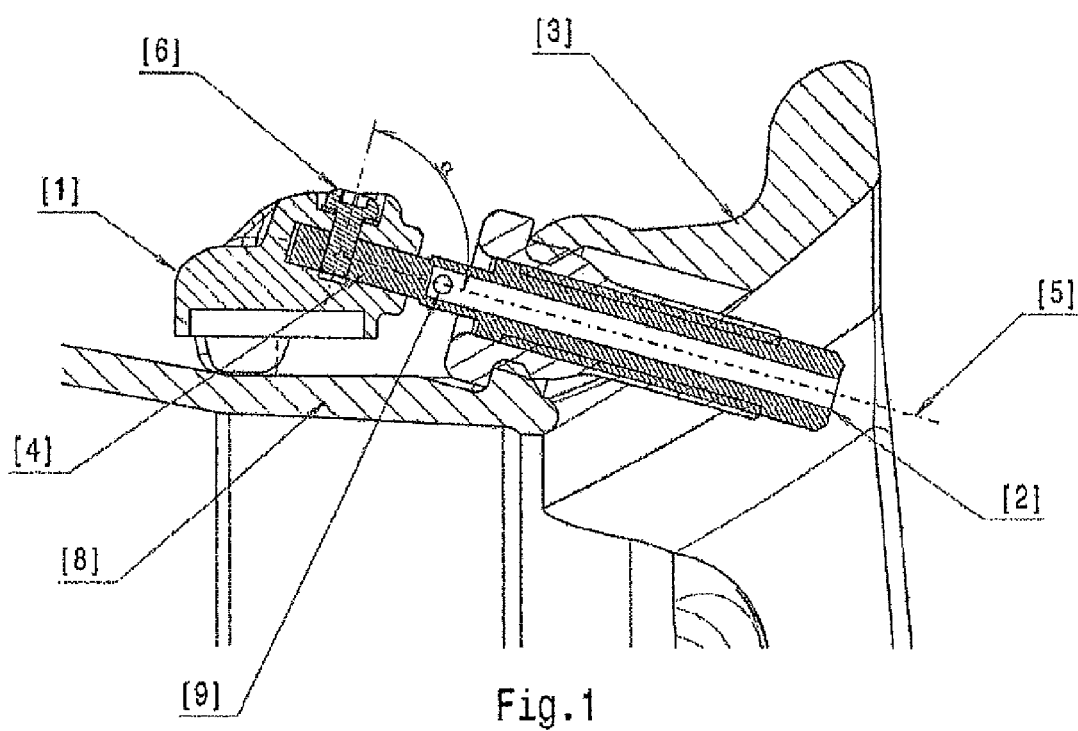
FIG. 1 a sectional view through a device for measuring tire pressure in a pneumatic tire

FIG. 1 shows a housing 1 which contains the wheel electronics and is situated in a pneumatic tire in the region of the rim well 8. A snap-in valve 2 is situated in rim 3 such that valve base part 4, which is situated in the region of rim 3 and extends into the tire which is not expressly depicted, is detachably connected to housing 1 by means of a fastening element 6. Snap-in valve 2 or its valve axis 5 forms an angle alpha with fastening element 6. Angle alpha depends on the geometry of the rim and can form a variant depending on the rim type. A rotation lock ensures that the valve base can be inserted into housing 1 exactly such that fastening element 6, which is designed as pin 6 in this embodiment, can be rotated in thread 10 formed in valve base 4 to create a detachable connection. Air renewal takes place through air opening 9 which is situated substantially perpendicularly to valve axis 5 in this embodiment.

Figure 2:
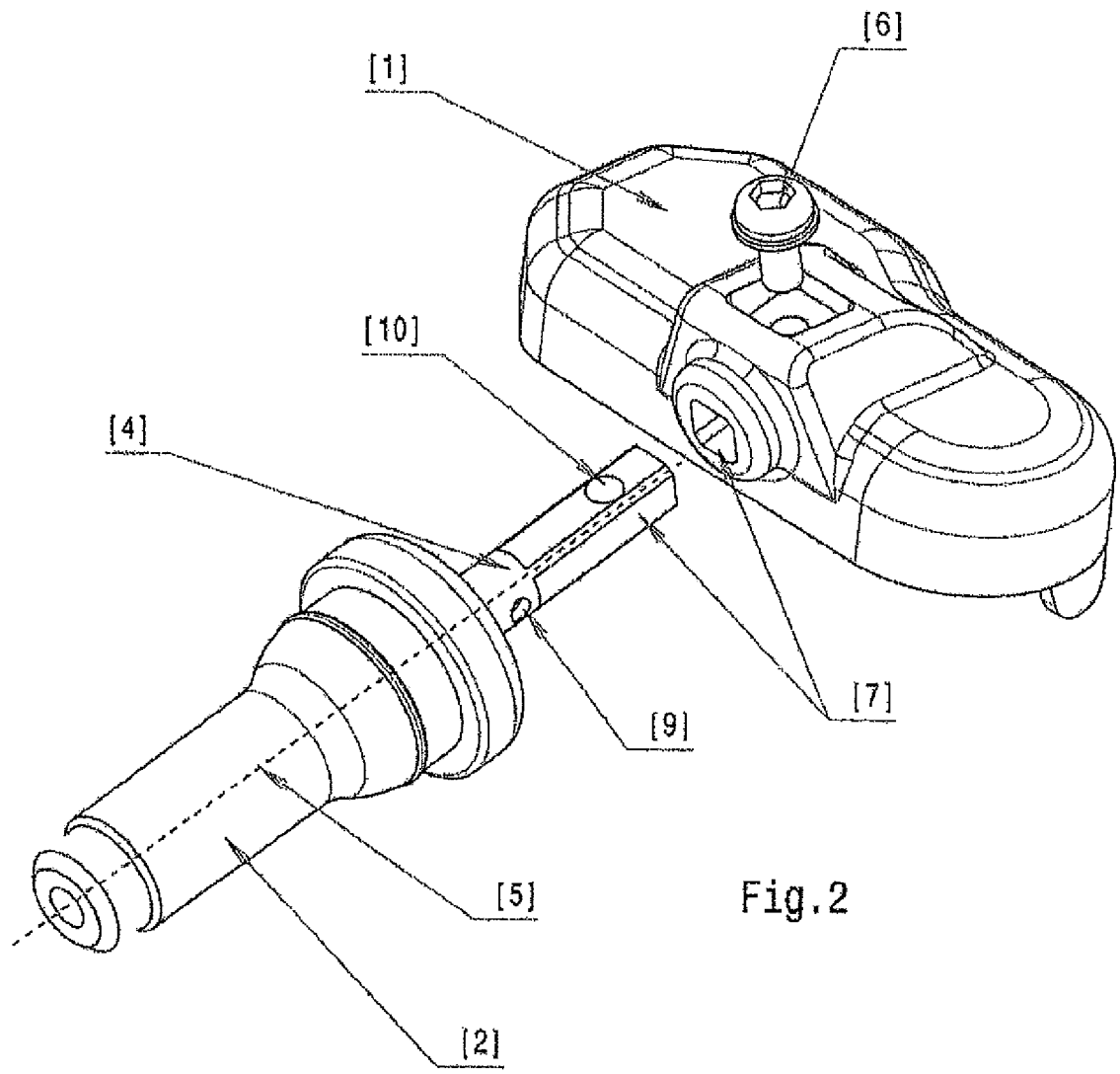
FIG. 2 shows a snap-in valve for fastening to a device according to FIG. 1

FIG. 2 shows the wheel electronics of a tire pressure monitoring system which is contained in housing 1 and is situated in a pneumatic tire, preferably in the region of the rim well which is not expressly depicted. A snap-in valve 2 is situated in the rim, which is not depicted in this figure, such that valve base part 4 can be detachably connected to housing 1 using a fastening element 6. Snap-in valve 2 or its valve axis 5 forms an angle alpha with fastening element 6. Angle alpha depends on the geometry of the rim and can form a variant depending on the rim type.

A rotation lock, which is designed as a square end in this embodiment, ensures that the valve base can be inserted into housing 1 exactly such that fastening element 6, which is designed as pin 6 in this embodiment, can be rotated in thread 10 formed in valve base 4 to create a detachable connection.

Air renewal takes place through air opening 9 which is situated substantially perpendicularly to valve axis 5 in this embodiment, and therefore the air supplied via the valve is connected directly to the interior of the tire since the passage opening is situated freely within the interior of the tire or the airspace in the tire.

Figure 3:
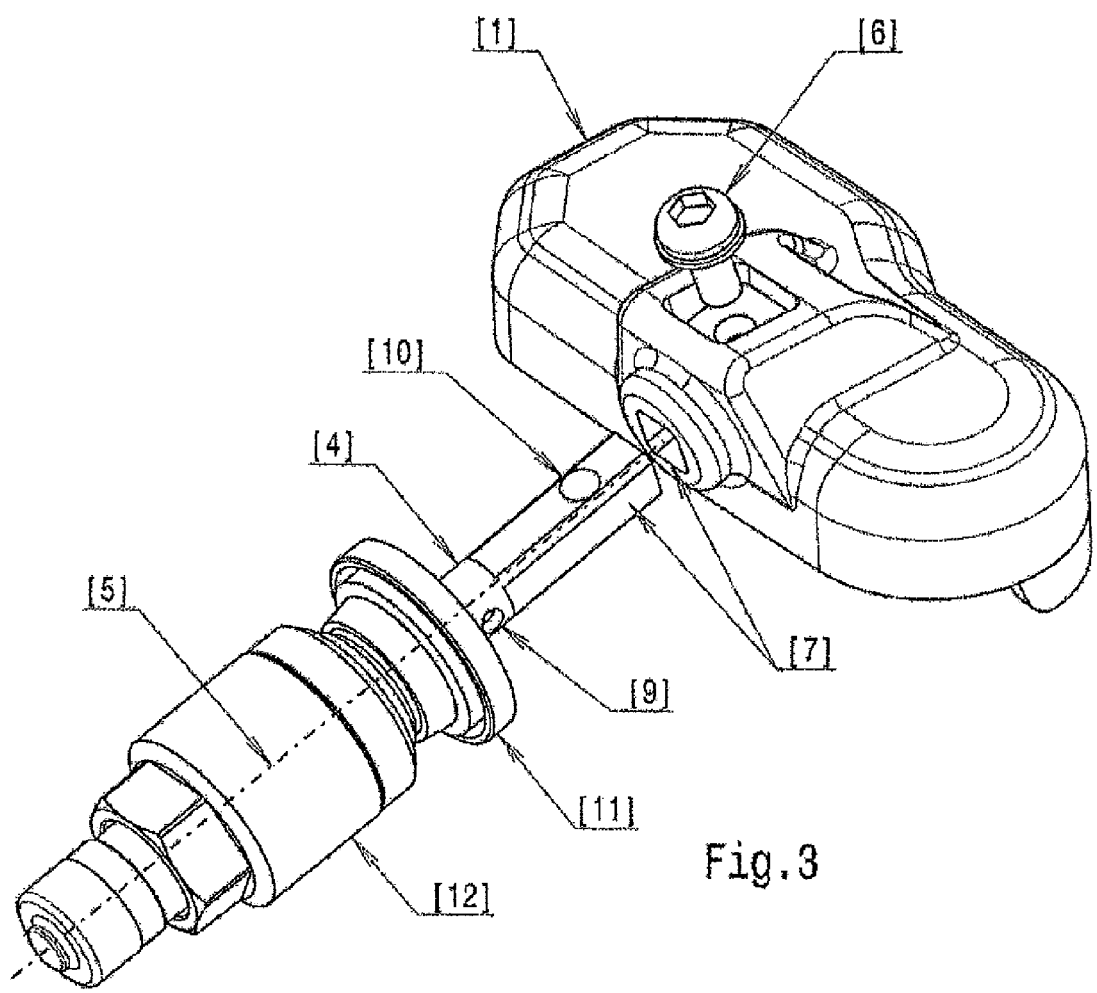
FIG. 3 shows a metal valve for fastening to a device according to FIG. 1

FIG. 3 shows the wheel electronics of a tire pressure monitoring system which is contained in housing 1 and is situated in a pneumatic tire, preferably in the region of the rim well which is not expressly depicted. A metal valve 11 is situated in the rim, which is not depicted in this figure, such that it is pined against the rim, which is not depicted, using the cap nut, and such that valve base part 4 can be detachably connected to housing 1 using a fastening element 6. Metal valve 11 or its valve axis 5 forms an angle alpha with fastening element 6. Angle alpha depends on the geometry of the rim and can form a variant for easy installation. A rotation lock, which is designed as a square end in this embodiment, ensures that the valve base can be inserted into housing 1 exactly such that fastening element 6, which is designed as pin 6 in this embodiment, can be rotated in thread 10 formed in valve base 4 to create a detachable connection.

LIST OF REFERENCE NUMERALS

1 Housing
2 Snap-in valve/tire valve
3 Rim
4 Valve base part
5 Valve axis
6 Fastening element
7 Rotation lock
8 Rim well
9 Air opening
10 Thread
11 Metal valve
12 Cap nut

The invention claimed is:

1. A device for measuring tire pressure in a pneumatic tire of a motor vehicle, the device comprising:
    a sensor disposed on a rim well of a rim, the rim accommodating a tire valve for the pneumatic tire;
    a receiver outside of the pneumatic tire and assigned to the sensor; an electronics or signal housing assigned to the rim well and connected to the tire valve; and
    transmission electronics for the tire pressure sensor disposed in the housing and connected to the tire valve by a fastening element proximate a valve base, the valve base being adapted for fitting into an opening of the electronics or signal housing, wherein an angle alpha between the fastening element and the valve axis is between 30 and 150 degrees and the opening of the electronics housing or signal housing includes a receiving element having a rotation lock for receiving the valve base of the tire valve.

2. The device for measuring tire pressure in a pneumatic tire of a motor vehicle according to claim 1 wherein the receiving element having a rotation lock includes at least one key surface.

3. The device for measuring tire pressure in a pneumatic tire of a motor vehicle according to claim 1 wherein the receiving element having a rotation lock includes at least one guide groove and/or one guide tongue.

4. The device for measuring tire pressure in a pneumatic tire of a motor vehicle according to claim 1 wherein the valve base includes at least one key surface and/or at least one guide groove and/or one guide tongue.

5. The device for measuring tire pressure in a pneumatic tire of a motor vehicle according to claim 1 wherein the fastening element is designed as a pin or a clamp or a spring.

6. The device for measuring tire pressure in a pneumatic tire of a motor vehicle according to claim 1 wherein the fastening element is connected to the valve base using a form-fit or non-positive connection.

7. The device for measuring tire pressure in a pneumatic tire of a motor vehicle according to claim 1 wherein the air opening is situated substantially perpendicularly to the valve axis in the region of the valve base.

* * * * *